(12) United States Patent  
Rankin

(10) Patent No.: US 6,501,886 B1
(45) Date of Patent: Dec. 31, 2002

(54) COMPACT OPTICAL SPLITTER AND COMBINER

(75) Inventor: Glenn Hoch Rankin, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/918,412

(22) Filed: Jul. 30, 2001

(51) Int. Cl.[7] ............................................. G02B 6/42
(52) U.S. Cl. ...................................................... 385/48
(58) Field of Search .................. 385/2–4, 8, 40–45, 385/48, 12, 16, 24, 20; 372/2, 4, 6, 45–46, 50; 359/109, 117, 123, 128, 127, 120, 334, 334.31, 339.33

(56) References Cited

U.S. PATENT DOCUMENTS

| | | | | |
|---|---|---|---|---|
| 5,324,076 A | * | 6/1994 | Nieradka | 248/441.1 |
| 5,325,388 A | * | 6/1994 | Gupta et al. | 372/45 |
| 5,341,234 A | * | 8/1994 | Suzuki et al. | 359/117 |
| 5,751,747 A | * | 5/1998 | Lutes et al. | 331/4 |
| 5,937,117 A | * | 8/1999 | Ishida et al. | 359/123 |
| 6,433,921 B1 | * | 8/2002 | Wu et al. | 359/334 |

* cited by examiner

Primary Examiner—Akm E. Ullah

(57) ABSTRACT

An optical splitter/combiner has a split end, i.e., input/output end that has at least a first input/output segment, a second input/output segment, a third input/output segment, and a fourth input/output segment. The optical splitter/combiner has an upper first stage junction that joins the first input/output segment and the second input/output segment, which define an upper first stage bisector. A lower first stage junction joins the third input/output segment and the fourth input/output segment, which define a lower first stage bisector. An upper intermediate segment communicates with the upper first stage junction. A lower intermediate segment communicates with the lower first stage junction. A second stage junction joins the upper intermediate segment and the lower intermediate segment to form a single input output segment. The upper intermediate segment and the lower intermediate segment define a second stage bisector. The upper first stage bisector and the lower first stage bisector are angularly offset from the second stage bisector. The use of angularly offset bisectors results in a reduced length of the optical splitter/combiner.

48 Claims, 4 Drawing Sheets

COMPACT OPTICAL SPLITTER AND COMBINER

BACKGROUND OF THE INVENTION

1. Field of the Invention

The present invention relates to an optical waveguide combiner or splitter, and more particularly to a compact optical waveguide combiner or splitter comprised of a plurality of different s-bends.

2. Background of the Invention

The telecommunications industry currently uses optical fiber to transmit data between users. Several approaches for sending data via optical fiber include the use of an optical waveguide combiner or splitter. An optical waveguide is a material medium that confines and guides a propagating electromagnetic wave such as light. Examples of a waveguide include an optical fiber or a planar lightwave circuit (PLC). A typical optical fiber may be 125 microns in diameter. When used in the communications industry, optical fiber is used as a transmission line that includes an inner dielectric material surrounded by an outer dielectric material. Examples of the outer dielectric material include air, glass, plastic or any dielectric material having a lower refractive index than the inner dielectric material. Electromagnetic waves are guided by a refractive index difference between inner and outer dielectric material so that the waves are confirmed to the waveguide. The waves are confined by refraction or reflection from the outer surface of the guide, or from surfaces within the guide. A waveguide combiner typically takes multiple waveguides or optical fibers and merges them, typically in two or more stages, into an output waveguide, e.g. a single optical fiber, by using S-bends and Y-junctions. A typical splitter reverses the above process by splitting a single waveguide into multiple waveguides.

For a given dielectric waveguide process (i.e., cladding index, core index, core dimensions, functional form of the S-bend), the horizontal size of the device can only be made so small before the losses become unacceptable, i.e., when the radius of the bends becomes to small, a fraction of the power that is guided by the core is radiated out of the waveguide and lost. It is known that the size of the core can be changed or the index difference between the core and the cladding can be increased to allow smaller bend radii.

SUMMARY OF THE INVENTION

The geometry of a waveguide process may be modified to make an optical splitter/combiner shorter, while still maintaining acceptable low losses. The Y-branches of a combiner may be modified such that the outputs are tilted. Therefore, full S-bends are not a necessary component of input segments thereof. It is desirable to avoid full S-bends because full S-bends result in extra length of the optical splitter/combiner. The optical splitter/combiner of an embodiment of the invention has a split, i.e., input/output, end that has at least a first input/output segment, a second input/output segment, a third input/output segment, and a fourth input/output segment. The optical splitter/combiner has an upper first stage junction that joins the first input/output segment and the second input/output segment. The first input/output segment and the second input/output segment define an upper first stage bisector. A lower first stage junction joins the third input/output segment and the fourth input/output segment and defines a lower first stage bisector. The third input/output segment and the fourth input/output segment define a lower first stage bisector. An upper intermediate segment communicates with the upper first stage junction. A lower intermediate segment communicates with the lower first stage junction. A second stage junction joins the upper intermediate segment and the lower intermediate segment to form a single input output segment. The upper intermediate segment and the lower intermediate segment define a second stage bisector. The upper first stage bisector and the lower first stage bisector are angularly offset from the second stage bisector. The use of angularly offset bisectors results in a reduced length of the optical splitter/combiner.

BRIEF DESCRIPTION OF DRAWINGS

A more complete understanding of the method and apparatus of the present invention may be obtained by reference to the following Detailed Description when taken in conjunction with the accompanying Drawings wherein.

DETAILED DESCRIPTION OF THE EXEMPLARY EMBODIMENTS OF THE INVENTION

Figure 1A:
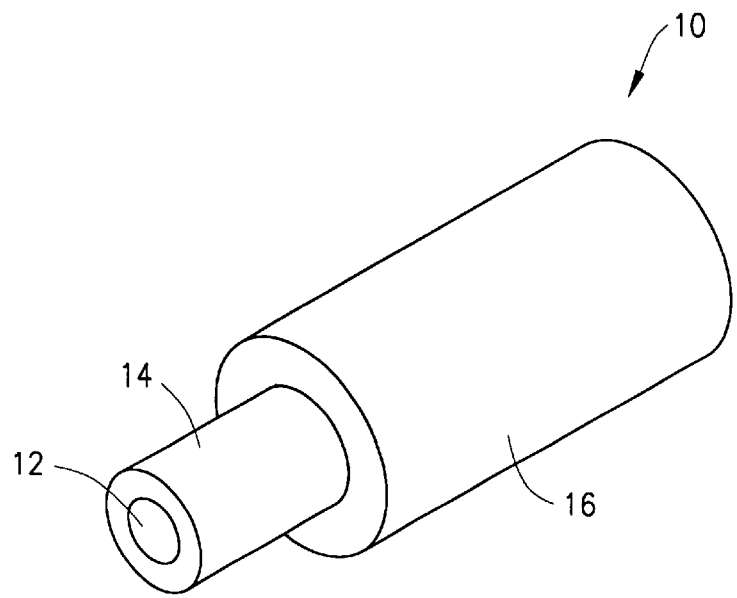
FIG. 1A is a partial cutaway perspective view of a typical optical waveguide or optical fiber.

Referring to FIG. 1A, a typical waveguide or optical fiber 10 that may be used with the present invention is comprised of a core 12, which may be constructed of silica based glass, plastics, lithium niobate, other materials or other semiconductor materials, such as indium phosphide. Core 12 is typically surrounded by cladding 14. Cladding 14 may be made of air, glass, plastic or any dielectric material having a lower refractive index than the inner dielectric material. Cladding 14 is typically surrounded by a polymer overcoat 16. In use, optical waveguide or optical fibers 10 may be required to be combined or split for various applications.

Figure 1B:
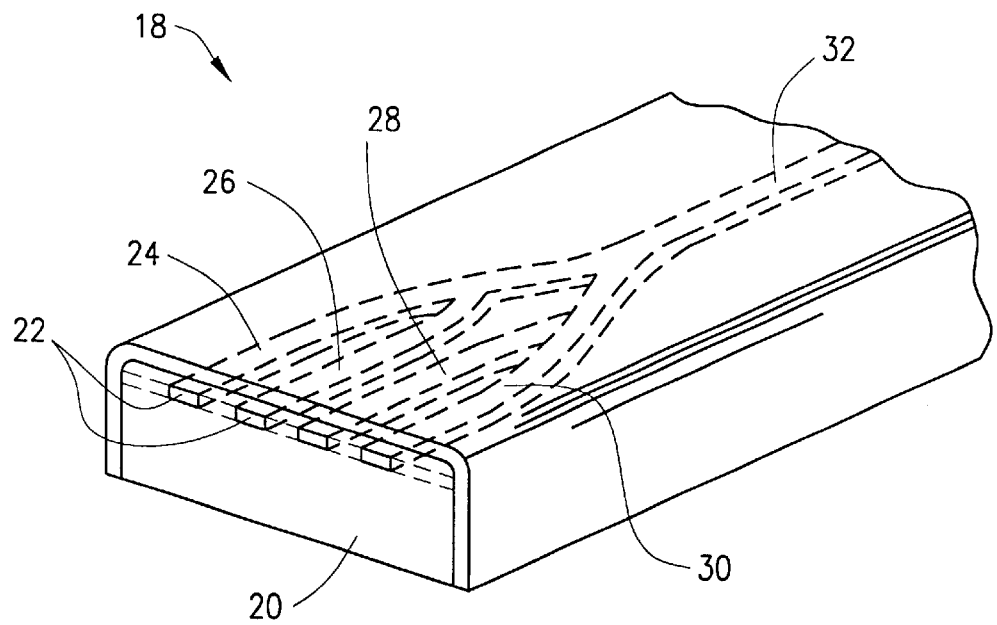
FIG. 1B is a perspective view of a typical waveguide combiner or planar lightwave circuit showing the waveguides with dashed lines.

Referring now to FIG. 1B, a waveguide splitter/combiner or planar lightwave circuit (PLC) 18 is shown that is an embodiment of the invention. Angles may not be shown to scale. PLC 18 is a monolithic structure having a substrate that forms a cladding layer 20 of PLC 18. A waveguide core layer 22 is used to form waveguides 24, 26, 28 and 30, which combine to form a single waveguide 32.

Figure 2:
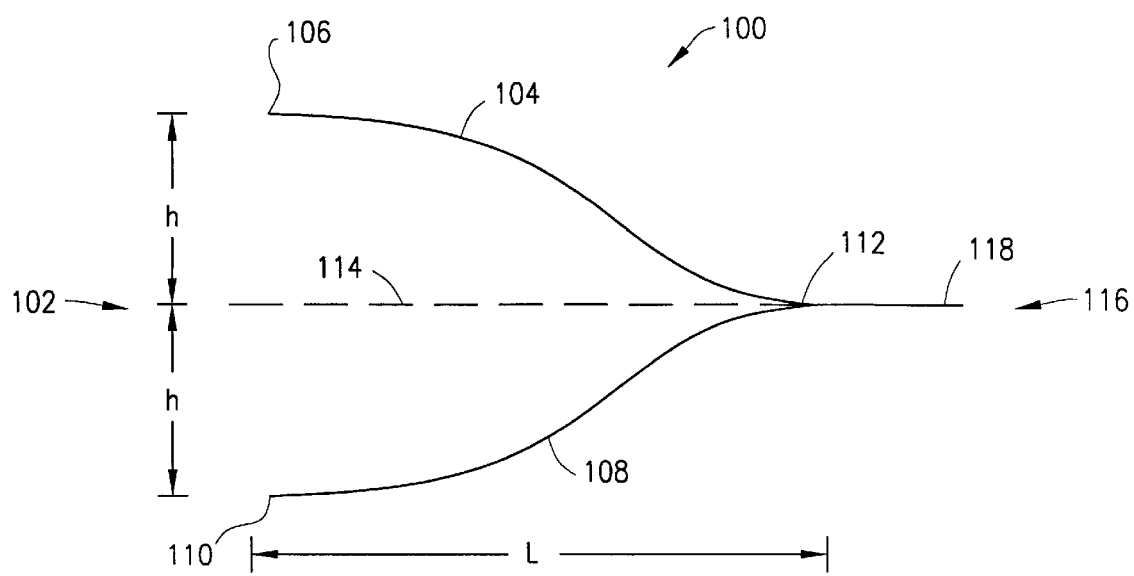
FIG. 2 is a prior art optical splitter/combiner.

Referring now to FIG. 2, a prior art optical splitter/combiner or Y-branch 100 is shown. One example of an optical splitter/combiner 100 is described in an article by G. Bogert and Y. Chen entitled *Low-Loss Y-Branch Power Dividers*, Elect. Lett. Vol. 25, No. 25, pp. 1712–1713, which is incorporated herein by reference. A typical optical splitter/combiner 100 may be used as either a combiner or a splitter, depending upon which end of the optical splitter/combiner 100 is used as an input end. Optical splitter/combiner 100 has a split end 102 having a first input/output segment 104. Input/output segment 104 has a terminal end 106. Split end 102 additionally has a second input/output segment 108. Second input/output segment 108 also has a terminal end 110. Optical splitter/combiner 100 has a height of 2 h and a length L. First input/output segment 104 and second input/output segment 108 are joined together at junction 112. The optical splitter/combiner 100 defines a bisector 114. A combined end 116 is formed to the right of the junction 112, which joins segments 104 and 108 as shown in FIG. 2. Combined end 116 has a single input/output segment 118 in communication with junction 112.

Still referring to FIG. 2, for a given vertical spacing 2 h between first input/output segment 104 and second input/output segment 108, a minimum length L for a given waveguide implementation must be exceeded by the optical splitter/combiner 100 or the amount of power lost from the waveguide becomes unacceptable due to the curvature of the segments 104 and 108 being too extreme. An example of an optical splitter/combiner 100 having a configuration resulting in acceptable waveguide losses has a first input/output segment 104 and second input/output segment 108 having a curvature that assumes the form of raised-sine bends. Orientation of the raised-sine bends may be described by the equation:

$$x=(hz/L)-((h/2\pi)\sin(2\pi z/L))$$

wherein:
x=distance of a curve from the center line or bisector 114;
z=distance along the center line or bisector 114;
h=height at the input/output at split end 102, measured from the center line or bisector 114;
L=horizontal distance from the split end 102 to the combined end 116; (See, "Low-Loss Y-Branch Power Dividers," Elect. Lett., Dec. 7, 1989, Vol. 25, No. 25).

An example curvature for the S-bends of the first input/output segment 104 and the second input/output segment 108 is 3.24 mm, which exhibits acceptable losses for square waveguides when the refractive index of the core is 0.75% higher than that of cladding material.

Figure 3:
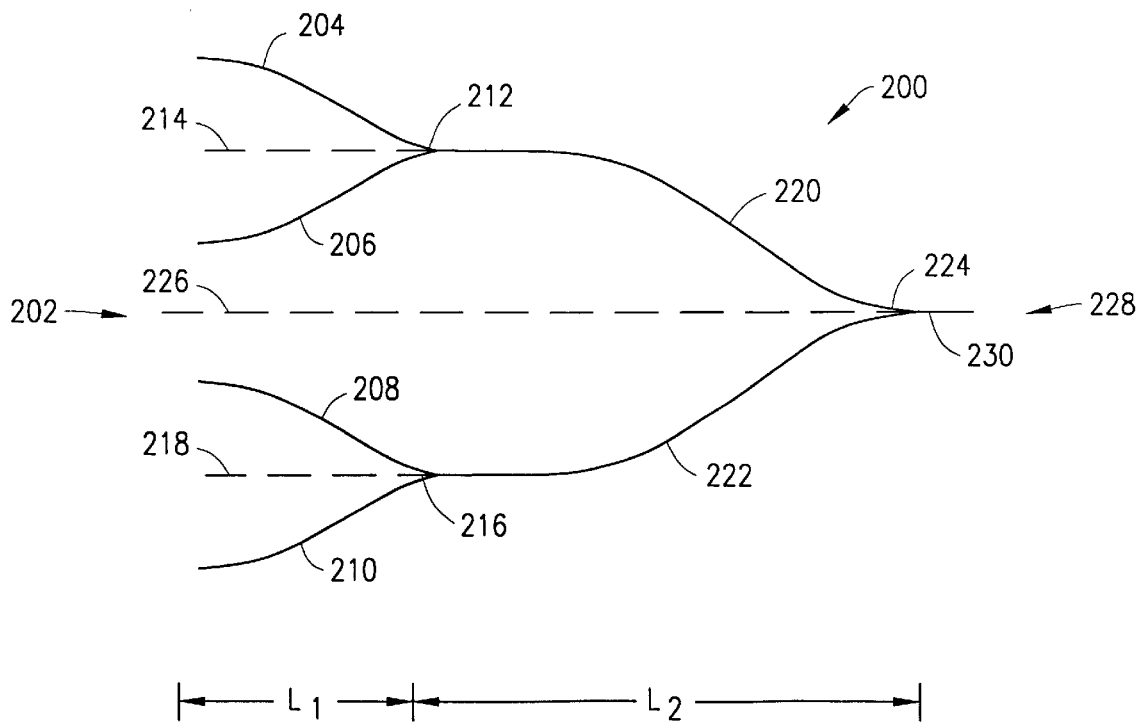
FIG. 3 is a prior art four input waveguide.

Referring now to FIG. 3, a four input optical waveguide or optical splitter/combiner 200 may be developed by repeating the structure described with reference to FIG. 2. Although the term "four input" is used herein, it should be understood that the optical splitter/combiner 200 may also be used as a four output optical waveguide. Four input optical splitter/combiner 200 has a split end 202 having four input/output segments 204, 206, 208 and 210 wherein the four input/output segments are made up of a first input/output segment 204, a second input/output segment 206, a third input/output segment 208, and a fourth input/output segment 210. The first input/output segment 204 and the second input/output segment 206 join at an upper first stage junction 212. The first input/output segment 204 and the second input/output segment 206 define an upper first stage bisector 214. Fourth input/output segment 210 and third input/output segment 208 join at a lower first stage junction 216. Third input/output section 208 and fourth input/output segment 210 define a lower first stage bisector 218. An upper intermediate segment 220 communicates with the upper first stage junction 212. A lower intermediate segment 222 communicates with lower first stage junction 216. The upper intermediate segment 220 and the lower intermediate segment 222 join at a second stage junction 224. Upper intermediate segment 220 and lower intermediate segment 222 define a second stage bisector or center line 226. A combined end 228 has a single input/output segment 230 that communicates with the second stage junction 224. It should be noted that in the prior art, such as optical splitter/combiner 200, which is shown in FIG. 3, the upper first stage bisector 214 and the lower first stage bisector 218 are parallel to each other and to the second stage bisector or center line 226. Note also that the $L_2$ length is necessarily increased in the second stage juncture because the vertical distance between the arms 220, 222 has increased.

Figure 4:
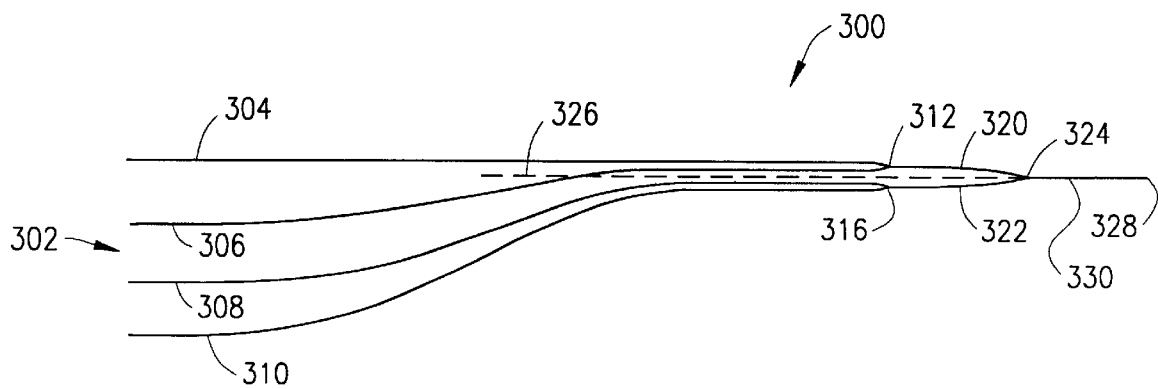
FIG. 4 is a second type of prior art four input waveguide.

Referring now to FIG. 4, a four input optical waveguide or optical splitter/combiner 300 is shown. Although the term, "four input" is used herein, it should be understood that the optical splitter/combiner 300 could be used as a four output optical waveguide as well. Optical splitter/combiner 300 has a split end 302 having four input/output segments 304, 306, 308 and 310 wherein the four input/output segments are made up of a first input/output segment 304, a second input/output segment 306, a third input/output segment 308, and a fourth input/output segment 310. The first input/output segment 304 and the second input/output segment 306 join at an upper first stage junction 312. First input/output segment 304 and second input/output segment 306 are horizontal, as shown in FIG. 4, in the region immediately preceding upper first stage junction 312. The first input/output segment 304 and the second input/output segment 306 define an upper first stage bisector (not shown), which is parallel to segments 304 and 306 in the region immediately preceding upper first stage junction 312. Fourth input/output segment 310 and third input/output segment 308 join at a lower first stage junction 316. Third input/output segment 308 and fourth input/output segment 310 join at a lower first stage junction 316. Third input/output section 308 and fourth input/output segment 310 define a lower first stage bisector (not shown), which is parallel to segments 308 and 310 in the region immediately preceding lower first stage junction 316. An upper intermediate segment 320 communicates with the upper first stage junction 312. A lower intermediate segment 322 communicates with lower first stage junction 316. The upper intermediate segment 320 and the lower intermediate segment 322 join at a second stage junction 324. Upper intermediate segment 320 and lower intermediate segment 322 define a second stage bisector or center line 326. A combined end 328 has a single input/output segment 330 that communicates with the second stage junction 324. It should be noted that in prior art optical splitter/combiners 300, as shown in FIG. 4, the upper first stage bisector (not shown) and the lower first stage bisector (not shown) are parallel to each other and to the second stage bisector or center line 326.

Note that first input/output segment 304, second input/output segment 306, third input/output segment 308, fourth input/output segment 310 are S-bends that start and end horizontally, i.e., parallel to upper first stage bisector and lower first stage bisector and to second stage bisector 326. The length of the optical splitter/combiner 300 is limited by the maximum curvature in the bends.

Figure 5:
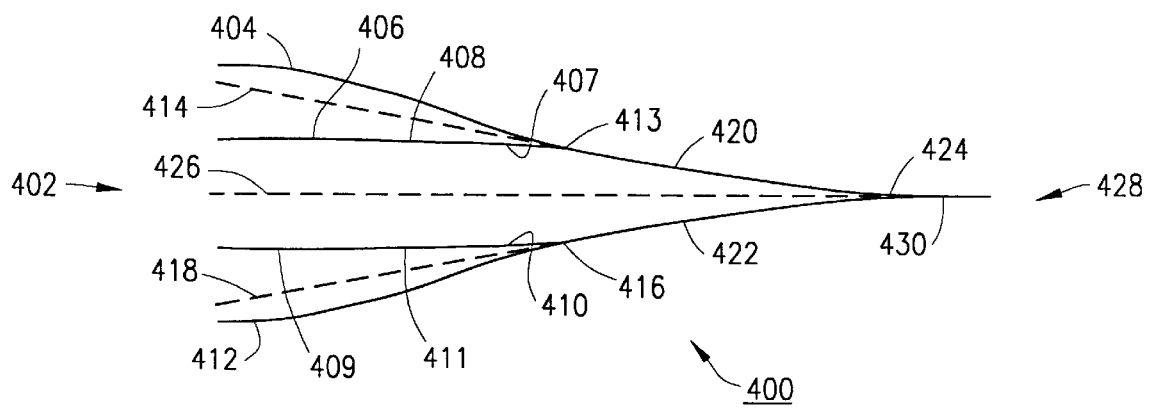
FIG. 5 is an embodiment of an optical splitter/combiner of the invention.

FIG. 5 shows a preferred embodiment of an optical splitter/combiner 400 of the invention. A split end 402 of the optical splitter/combiner 400 has four input/output segments, 404, 406, 409, 412. An example size of the optical cores in segments 404, 406, 409 and 412 is 4.8 microns. The minimum spacing between the centers of each optical waveguide is typically 125 microns or the diameter of the fibers coupled to the split end, although other dimensions are possible. For example, an industry standard for a ribbon cabled system has a spacing of 250 microns. The input/output segments are a first input/output segment 404, a second input/output segment 406 having an upper segment 408 and a half raised-sine bend 407, third input/output segment 409 having an lower segment 411 and a half raised-sine bend or lower segment 410, and fourth input/output segment 412. The first input/output segment 404 and the lower segment 407 of second input/output segment 406 join at an upper first stage junction 413. Lower segment 407 is the lower half of upper first stage junction 413. The first input/output segment 404 and the second input/output segment 406 define an upper first stage bisector 414.

Although a "four input/output" optical waveguide or optical splitter/combiner is shown above, a "two input/output" optical waveguide or optical splitter/combiner could be formed from an upper or lower half of optical splitter/combiner 300. Further, a "three input" could be formed by eliminating one of the four inputs shown in FIG. 4. Finally, the optical splitter/combiner 300 or any portions thereof, may be used as part of a larger optical splitter/combiner system.

The fourth input/output segment 412 and the lower segment 410 of the third input/output segment 409 join at a lower first stage junction 416. The third input/output segment 409 and the fourth input/output segment 412 define a lower first stage bisector 418. An upper intermediate section 420 communicates with the upper first stage junction 413. A lower intermediate segment 422 communicates with the lower first stage junction 416. Lower segment 411 is the upper half of lower first stage junction 416. The upper intermediate segment 420 and the lower intermediate segment 422 join at a second stage junction 424. The upper intermediate segment 420 and lower intermediate segment 422 define a second stage bisector 426.

Optical splitter/combiner 400 has a combined end 428 which has a single input/output segment 430. Input/output segment 430 communicates with second stage junction 424. Upper first stage bisector 414 and lower first stage bisector 418 are angularly offset from the second stage bisector or center line 426. In the case of a two input/output optical waveguide, which is formed form an upper or lower half of optical splitter/combiner 300, center line 426 will be referred to as a reference line. A preferred angular offset between said first stage bisector and said centerline is at least 5°. Similarly, a preferred angular offset between said second stage bisector and said centerline is at least 5°.

The first input/output segment 404 and the upper intermediate segment 420 executes a smooth curve. Similarly, the fourth input/output segment 412 and the lower intermediate segment 422 may also execute a smooth curve. The exemplary curve has a minimum radius of curvature of 3.24 mm. The curves are made typically of several segments that are each half raised-sine bends that have the form described by the equation:

$$x = h(z/L - ((1/\pi)(\sin[\pi(z/L)])))$$

wherein for example:
x = the distance of curve 420 from the center line or second stage bisector 426;
z = the distance along the center line or second stage bisector 426;
h = the height at the input/output on split end 402, measured from the center line or second stage bisector 426;
L = maximum value of z, i.e., z=0 and z=L are ends of the segment.

Figure 6:
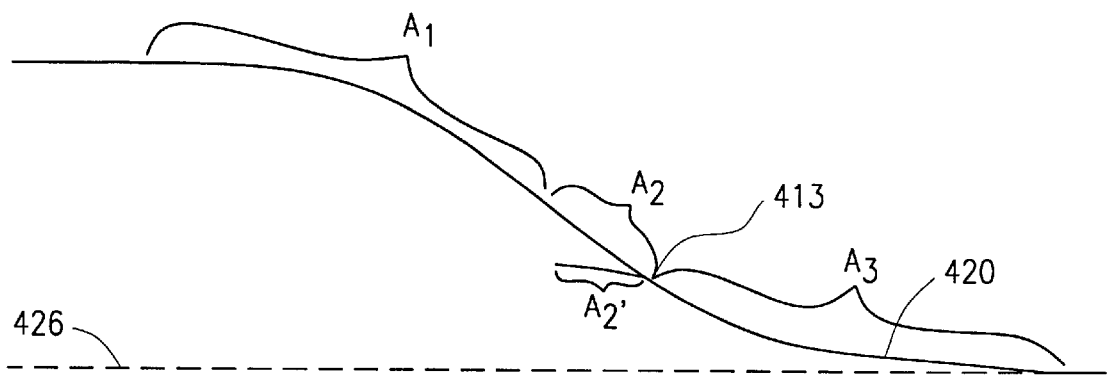
FIG. 6 shows a half raised-sine bends that may be used in construction of the optical splitter/combiner of FIG. 5.

Referring now to FIG. 6, the curves that make up the pathway from the terminal end of input/output segments 404 and 412 to the second stage bisector 426 are comprised of three parts. The three parts include an initial half raised-sine bend $A_1$ or upper half raised-sine bend that starts the waveguide traveling toward the center line or second stage bisector 426. The second part is a small symmetric Y-junction 413 comprised of a transition segment designated $A_2$. The small symmetric Y-junction 413 is made of two half raised-sine bends, $A_2$, $A_2$, that are made up a smooth curve joining with first input/output segment 404 and of upper segment 407. Additionally, upper intermediate segment 420 is made up of a half sine bend $A_3$ that continues toward the center line 426 and curves to become horizontal or parallel to the center line 426 just as it approaches the center line 426. Additionally, the slopes of $A_1$, $A_2$, and $A_3$ match where the three curves meet.

The half raised-sine bend $A_1$ is defined by the equation set forth above, which has two unknowns, h and L. One of the unknowns may be computed from the maximum curvature ($C_{max}$), which is described, in this case, by the equation $$C_{max} = \frac{\pi h}{L^2}.$$

Symmetric Y-junction $A_2$, $A_2$, is defined by the equation wherein the angle of the bisector is unknown but which may be determined once the parameters for $A_1$ are specified. As an example, the equation set forth above may be solved where $C_{max}$ is given and h has an appropriately small value, i.e., given $C_{max}$, h may be chosen with a reasonable value, which then yields all coefficients. A starting angle of $A_3$ is known once the tilt of $A_2$ is determined, which enables the size and shape of $A_3$ to be computed. In the example above, the full height of the optical splitter/combiner 400 is 0.375 mm.

Still referring to FIG. 6, a method of constructing an optical splitter/combiner 400 described above and shown in FIG. 5, includes the steps of estimating height (h) of the half raised-sine bend $A_1$. The height of the upper part is then computed given the initial guess h. If the result is larger than 3.75, then h is reduced and the calculation is repeated. If necessary, i.e., if the overall height of the optical splitter/combiner 400 is greater than the specified design constraint, then the height of half raised-sine bend $A_1$ should be re-estimated until a desired difference between an overall height of the optical splitter/combiner 400 and the design constraint, e.g., 0.375 mm is reached. The results of the estimating and computing steps described above should be a series of three connected half raised-sine bends, $A_1$, $A_2$, $A_3$, having a desired maximum second derivative and which have matching slopes where the half raised-sine bends, $A_1$, $A_2$, and $A_3$, meet.

Figure 7:
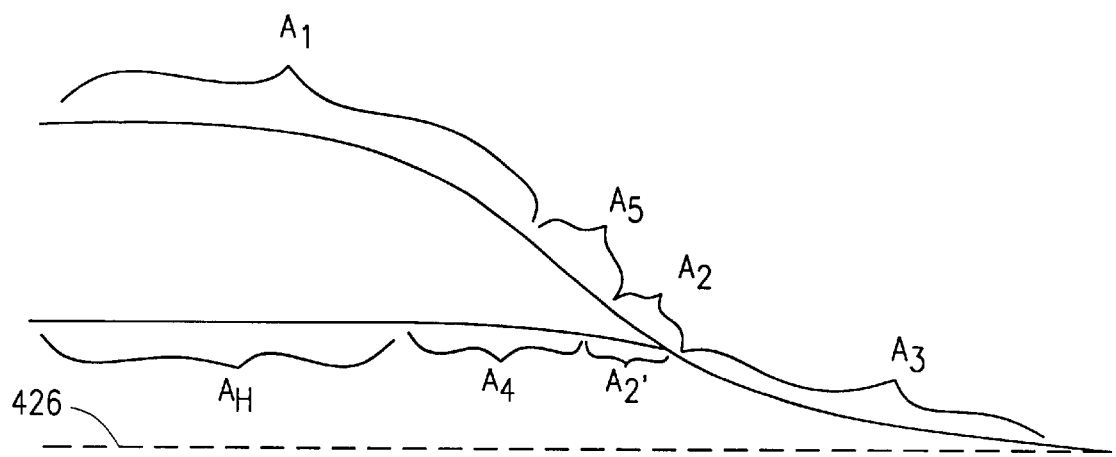
FIG. 7 shows a second configuration of half raised-sine bends that may be used in construction of the optical splitter/combiner of FIG. 5.

Referring now to FIG. 7, if necessary, a straight segment $A_s$ may be inserted between segments $A_1$ and $A_2$. That is, given certain spacings between waveguides then straight spacing segments may be required. The estimating step described above should then be repeated, as well as the computing step and the determining step to obtain the parameters for $A_1$, $A_2$ and $A_3$. Parameters of half raised-sine bend $A_4$ should then be computed such that a terminal end of upper segment 407 ($A_2$) ends at a desired height or distance from center line 426. At this time it should be verified that the radius of $A_4$ does not fall below a required minimum. Horizontal segment $A_H$ may be affixed to the terminal end of $A_4$. Segment $A_H$ should then be extended to terminate directly below a terminal end of segment $A_1$. Once the desired design criteria have been met, the above structure may be reflected about the center line 426 and added to the above described structure to form a collection of waveguide segments that make up the 4 to 1 divider/combiner out of two stages of Y-branches, which is shown in FIG. 5.

While specific embodiments of the invention are shown herein, it should be apparent to those skilled in the art that it is not so limited, but is susceptible to various changes without departing from the scope of the invention.

I claim:

1. An optical splitter/combiner comprising:
   a split end having at least a first input/output segment, a second input/output segment, a third input/output segment, and a fourth input/output segment;
   an upper first stage junction that joins said first input/output segment and said second input/output segment;
   wherein said first input/output segment and said second input/output segment define an upper first stage bisector;
   a lower first stage junction that joins said third input/output segment and said fourth input/output segment;
   wherein said third input/output segment and said fourth input/output segment define a lower first stage bisector;
   an upper intermediate segment that communicates with said upper first stage junction;
   a lower intermediate segment that communicates with said lower first stage junction;
   a second stage junction that joins said upper intermediate segment and said lower intermediate segment to form a single input output segment;
   wherein said upper intermediate segment and said lower intermediate segment define a second stage bisector; and
   wherein said upper first stage bisector and said lower first stage bisector are angularly offset from said second stage bisector.

2. The optical splitter/combiner according to claim 1 wherein said second input/output segment comprises an upper segment and a half raised-sine bend.

3. The optical splitter/combiner according to claim 2 wherein said upper segment of said second input/output segment is a portion of said upper first stage junction.

4. The optical splitter/combiner according to claim 1 wherein said third input/output segment comprises a lower segment and a half raised-sine bend.

5. The optical splitter/combiner according to claim 4 wherein said lower segment of said third input/output segment is a portion of said lower first stage junction.

6. The optical splitter/combiner according to claim 1 wherein said second stage bisector is a centerline of said optical splitter/combiner.

7. The optical splitter/combiner according to claim 1 wherein said first input/output segment and said upper intermediate segment execute a smooth curve.

8. The optical splitter/combiner according to claim 1 wherein said first input/output segment and said fourth input/output segment are raised-sine bends; and
   said raised-sine bends are described by the equation:

$$x = h(z/L - ((1\pi)(\sin[\pi(z/L)])))$$

wherein:
   x = a distance of one of said first and said fourth segments from said second stage bisector;
   z = a distance along said second stage bisector;
   h = a height at an input of one of said first and fourth segments, measured from said second stage bisector; and
   L = a length of said first input/output segment and said fourth input/output segment.

9. The optical splitter/combiner according to claim 8 wherein said second stage bisector is a centerline.

10. The optical splitter/combiner according to claim 7 wherein said curve is comprised of three parts comprising:
    an initial half raised-sine bend that bends toward said second stage bisector;
    a Y-junction having an outer portion comprised of a half raised-sine bend; and
    an intermediate half raised-sine bend that curves to be substantially horizontal as it intersects said second stage bisector.

11. The optical splitter/combiner according to claim 10 wherein said Y-junction is symmetric.

12. The optical splitter/combiner according to claim 10 wherein said parts are comprised of said initial half raised-sine bend, said outer portion of said Y-junction, and said intermediate half sine bend each have a slope relative to a center line; and
    wherein said initial half raised-sine bend, said outer portion of said Y-junction, and said intermediate half sine bend have matching slopes where said initial half raised-sine bend, said outer portion of said Y-junction, and said intermediate half sine intersect.

13. The optical splitter/combiner according to claim 10 wherein said initial half raised-sine bend is defined by an equation having two unknowns.

14. The optical splitter/combiner according to claim 10 wherein said Y-junction is defined by an equation wherein an angle is unknown, but can be determined once parameters for said initial half raised-sine bend are specified.

15. The optical splitter/combiner according to claim 10 wherein a starting angle of said intermediate half raised-sine bend is known once a tilt of said outer portion of said Y-junction is determined, thereby enabling a size and shape of said intermediate half raised-sine bend to be computed.

16. The optical splitter/combiner according to claim 1 wherein said angular offset is at least 5°.

17. The optical splitter combiner according to claim 1 wherein the optical splitter combined comprises a monolithic structure.

18. A method of constructing an optical splitter/combiner comprising:
    estimating a height of an initial half raised-sine bend;
    computing an overall height of said optical splitter/combiner;
    determining whether said overall height of said optical splitter/combiner is less than a selected parameter;
    re-estimating said height of said initial half raised-sine bend and re-computing said overall height until a desired difference between said overall height of said optical splitter/combiner and said selected parameter is reached; and
    wherein a result of said estimating and computing steps is a series of three connected half raised-sine bends having a desired maximum second derivation and having matching slopes where said half raised-sine bends meet.

19. The method of constructing an optical splitter/combiner according to claim 18 wherein said three connected half raised-sine bends comprise:
    an initial half raised-sine bend that bends toward a second stage bisector;
    a Y-junction having an outer portion made of a half raised-sine bend; and
    an intermediate half sine bend that is parallel to a said second stage bisector where said intermediate half sine bend intersects said second stage bisector.

20. The method of constructing an optical splitter/combiner according to claim 18, further comprising:
adding a straight segment between said initial half raised-sine bend and said Y-junction; and
repeating said estimating step, said computing step and said determining step to determine parameters for said initial half raised-sine bend, said Y-junction, and said intermediate half sine bend.

21. The method of constructing an optical splitter/combiner according to claim 18, further comprising:
computing parameters of an additional half raised-sine bend that connects to a terminal end of an inner segment of said Y-junction and that ends at a desired distance from a second stage junction.

22. The method of constructing an optical splitter/combiner according to claim 21, further comprising:
verifying that a radius of said additional half raised-sine bend does not fall below a required minimum;
adding a horizontal segment to an end of said additional half raised-sine bend; and
extending a horizontal segment to terminate directly below an end of said initial half raised-sine bend.

23. An optical system utilizing an optical splitter/combiner, said splitter/combiner comprising:
a split end having at least a first input/output segment and a second input/output segment;
an upper initial half raised-sine bend that communicates with said first input/output segment;
a lower initial half raised-sine bend that communicates with said second input/output segment;
an upper transition half raised-sine bend in communication with said upper initial half raised-sine bend;
a lower transition half raised-sine bend in communication with said lower initial half raised-sine bend;
an upper intermediate half raised-sine bend in communication with said upper transition half raised-sine bend;
a lower intermediate half raised-sine bend in communication with said lower transition half raised-sine bend; and
a junction that joins said lower intermediate end half raised-sine bend and said upper intermediate half raised-sine bend combined end to form a single input/output segment.

24. The optical splitter/combiner according to claim 23 further comprising:
a straight segment located between said lower initial half raised-sine bend and said lower transition half raised-sine bend.

25. The optical splitter/combiner according to claim 23 further comprising:
a straight segment located between said upper initial half raised-sine bend and said upper transition half raised-sine bend.

26. The optical splitter/combiner according to claim 23 wherein said upper transition half raised-sine bend comprises an upper half of an upper Y-junction.

27. The optical splitter/combiner according to claim 26 wherein said upper Y-junction is symmetric.

28. The optical splitter/combiner according to claim 23 wherein said lower transition half raised-sine bend comprises a lower half of a lower-Y junction.

29. The optical splitter/combiner according to claim 28 wherein said lower Y-junction is symmetric.

30. The optical splitter/combiner according to claim 23 wherein said upper initial half raised-sine bend, said upper transition half raised-sine bend, said upper intermediate half raised-sine bend, said lower initial half raised-sine bend, said lower transition half raised-sine bend, said lower intermediate half raised-sine bend are described by the equation:

$$x = h(z/L - ((1/\pi)(\sin [\pi(z/L)])))$$

wherein:
x = a distance of one of said curves from a centerline;
z = a distance along said centerline;
h = a height at an input, measured from said centerline; and
L = a length from said input to said junction.

31. The optical splitter/combiner according to claim 23 wherein at least one of said upper initial half raised-sine bend and said lower initial half raised-sine bend is defined by an equation having two unknowns.

32. The optical splitter/combiner according to claim 27 wherein said upper Y-junction is defined by an equation wherein an angle is unknown, but can be determined once parameters for said upper initial half raised-sine bend are specified.

33. The optical splitter/combiner according to claim 29 wherein said lower Y-junction is defined by an equation wherein an angle is unknown, but can be determined once parameters for said initial half raised-sine bend are specified.

34. The optical splitter/combiner according to claim 27 wherein a starting angle of said upper intermediate half raised-sine bend is known once a tilt of said upper half of said upper Y-junction is determined, thereby enabling a size and shape of said upper intermediate half raised-sine bend to be computed.

35. The optical splitter/combiner according to claim 29 wherein a starting angle of said lower intermediate half raised-sine bend is known once a tilt of said lower half of said lower Y-junction is determined, thereby enabling a size and shape of said lower intermediate half raised-sine bend to be computed.

36. An optical splitter/combiner comprising:
a split end having at least a first input/output segment and a second input/output segment;
an upper first stage junction that joins said first input/output segment and said second input/output segment;
wherein said first input/output segment and said second input/output segment define an upper first stage bisector;
an upper intermediate segment that communicates with said upper first stage junction at a first end and communicates with an input/output segment at a second end, wherein said input/output segment at said second end of said upper intermediate segment has an orientation at an intersection of said input/output segment with said second intermediate segment; and
wherein said upper first stage bisector is angularly offset from said orientation of said input/output segment at said second end of said upper intermediate segment.

37. The optical splitter/combiner according to claim 36 wherein said second input/output segment comprises an upper segment and a half raised-sine bend.

38. The optical splitter/combiner according to claim 37 wherein said upper segment of said second input/output segment is a portion of said upper first stage junction.

39. The optical splitter/combiner according to claim 36 wherein said first input/output segment and said upper intermediate segment execute a smooth curve.

40. The optical splitter/combiner according to claim 36 wherein said first input/output segment is a raised-sine bend; and said raised-sine bend is described by the equation:

$$x=h(z/L-((1/\pi)(\sin [\pi(z/L)])))$$

wherein:
x=a distance of said first segment from a reference line, wherein said reference line is aligned with said orientation of said input/output segment at said second end of said upper intermediate segment;
z=a distance along said second stage bisector;
h=a height at an input of said first segment, measured from said reference line; and
L=a length of said first input/output segment.

41. The optical splitter/combiner according to claim 39 wherein said curve is comprised of three parts comprising:
an initial half raised-sine bend that bends toward said second stage bisector;
a Y-junction having an outer portion comprised of a half raised-sine bend; and
an intermediate half raised-sine bend that curves to be substantially horizontal as it intersects said second stage bisector.

42. The optical splitter/combiner according to claim 41 wherein said Y-junction is symmetric.

43. The optical splitter/combiner according to claim 41 wherein said parts are comprised of said initial half raised-sine bend, said outer portion of said Y-junction, and said intermediate half sine bend each have a slope relative to a center line; and
wherein said initial half raised-sine bend, said outer portion of said Y-junction, and said intermediate half sine bend have matching slopes where said initial half raised-sine bend, said outer portion of said Y-junction, and said intermediate half sine intersect.

44. The optical splitter/combiner according to claim 41 wherein said initial half raised-sine bend is defined by an equation having two unknowns.

45. The optical splitter/combiner according to claim 41 wherein said Y-junction is defined by an equation wherein an angle is unknown, but can be determined once parameters for said initial half raised-sine bend are specified.

46. The optical splitter/combiner according to claim 41 wherein a starting angle of said intermediate half raised-sine bend is known once a tilt of said outer portion of said Y-junction is determined, thereby enabling a size and shape of said intermediate half raised-sine bend to be computed.

47. The optical splitter/combiner according to claim 36 wherein said angular offset is at least 5°.

48. The optical splitter/combiner according to claim 36 wherein the optical splitter/combiner comprises a monolithic structure.

* * * * *